United States Patent
Denney

(10) Patent No.: US 6,467,386 B1
(45) Date of Patent: *Oct. 22, 2002

(54) MULTIPLE CONTINUOUS PLATFORM CUTTING APPARATUS

(75) Inventor: Denys Denney, Bear, DE (US)

(73) Assignee: Foamex L.P., Linwood, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/467,156

(22) Filed: Dec. 20, 1999

Related U.S. Application Data

(63) Continuation of application No. 08/899,418, filed on Jul. 23, 1997, now Pat. No. 6,085,627.

(51) Int. Cl.[7] .............................. B26D 7/08; B29C 67/20
(52) U.S. Cl. .............................. 83/874; 83/176; 83/424; 83/425; 83/435; 83/435.2; 83/856; 264/163; 425/289; 425/335; 425/371
(58) Field of Search ...................... 83/870, 871, 874, 83/19, 176, 424, 425, 425.2, 425.3, 435, 435.2, 856, 858; 264/46.3, 148, 157, 160, 163, 293, 321; 425/289, 335, 362, 371, 373

(56) References Cited

U.S. PATENT DOCUMENTS

| | | |
|---|---|---|
| 795,359 A | 7/1905 | Moore ............... 264/163 X |
| 801,673 A | 10/1905 | Moore ............... 264/163 X |
| 1,964,969 A | 7/1934 | Werner |
| 1,971,087 A | 8/1934 | Werner |
| 2,695,571 A | 11/1954 | Kalmeijer |
| 3,081,496 A | 3/1963 | Moore |
| 3,186,271 A | 6/1965 | Kaiser ............... 83/874 |
| 3,240,855 A | 3/1966 | Voelker |
| 3,497,120 A | 2/1970 | Fischer et al. |
| 3,653,291 A | 4/1972 | Babcock |

(List continued on next page.)

FOREIGN PATENT DOCUMENTS

| | | |
|---|---|---|
| BE | 551358 | 10/1956 |
| DE | 3310921 | 9/1984 |
| DE | G9010105.7 | 9/1990 |
| FR | 1336014 | 7/1963 |

Primary Examiner—Clark F. Dexter
(74) Attorney, Agent, or Firm—Connolly Bove Lodge & Hutz LLP

(57) ABSTRACT

Apparatus for continuously shaping a compressible or cellular polymer material, such as polyurethane foam, by cutting portions of the material from a surface of one or more slabs of material (180) includes two compression rollers (146, 146a), two moving patterned platforms (132, 132a) interposed between the compression rollers, and one or more cutting blades (76) for transversely cutting the slab or slabs just as the cellular material emerges from between the compression rollers. At least one of the moving patterned platforms, preferably an endless belt, defines a recess or pattern of recesses. When a single slab or multiple slabs of material are fed and compressed between the compression rollers, a portion of the material from one side of the slab or slabs fills the recess or recesses in one of the moving patterned belts. The blade then transversely cuts the cellular material.

17 Claims, 5 Drawing Sheets

U.S. PATENT DOCUMENTS

| | | |
|---|---|---|
| 3,690,203 A | 9/1972 | Huttemann ............... 83/176 X |
| 3,730,031 A | 5/1973 | Huttemann |
| 3,800,650 A | 4/1974 | Schroder |
| 3,840,923 A | 10/1974 | Bos |
| 4,128,369 A | 12/1978 | Kemerer et al. |
| 4,148,855 A | 4/1979 | Stalter et al. |
| 4,278,482 A | 7/1981 | Poteet et al. |
| 4,290,248 A | 9/1981 | Kemerer et al. |
| 4,351,211 A | 9/1982 | Azzolini |
| 4,603,445 A | 8/1986 | Spann |
| 4,683,791 A | 8/1987 | Demont |
| 4,686,724 A | 8/1987 | Bedford |
| 4,700,447 A | 10/1987 | Spann |
| 4,740,258 A | 4/1988 | Breitscheidel |
| 4,748,792 A | 6/1988 | Jeffrey |
| 4,901,387 A | 2/1990 | Luke |
| 4,915,000 A | 4/1990 | MacFarlane |
| 5,059,111 A | 10/1991 | Mössinger et al. |
| 5,129,295 A | 7/1992 | Geffros et al. |
| 5,252,278 A | 10/1993 | Spann et al. |
| 5,299,483 A | 4/1994 | Ber-Fong |
| 5,331,874 A | 7/1994 | Foster et al. |
| 5,413,807 A | 5/1995 | Duggan et al. |
| 5,477,573 A | 12/1995 | Bonaddio et al. |
| 5,534,208 A | 7/1996 | Barr et al. |
| 5,573,350 A | 11/1996 | Stegall |
| 5,688,538 A | 11/1997 | Barr et al. ................... 83/19 X |
| 5,749,993 A * | 5/1998 | Denney et al. ............. 83/19 X |
| 5,819,631 A * | 10/1998 | Denney ....................... 83/874 |
| 6,085,627 A * | 6/2000 | Denney ....................... 83/874 |
| 6,142,053 A * | 11/2000 | Denney et al. ............... 83/874 |
| 6,173,638 B1 * | 1/2001 | Denney ....................... 83/874 |

* cited by examiner

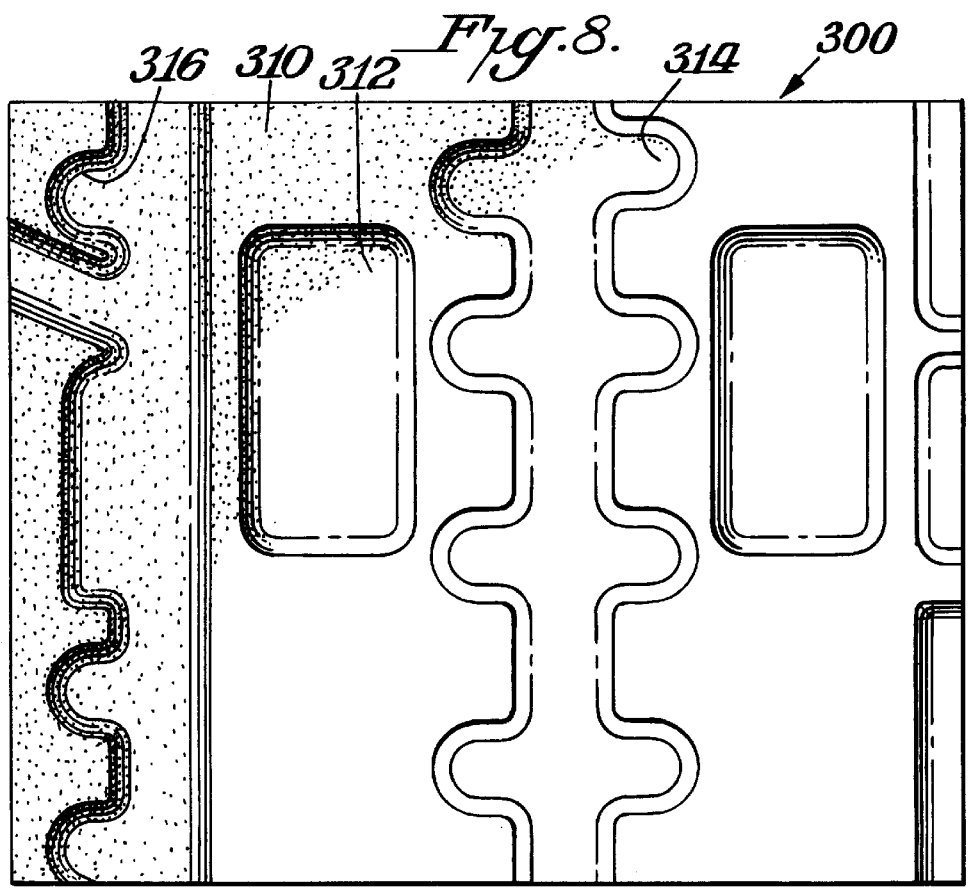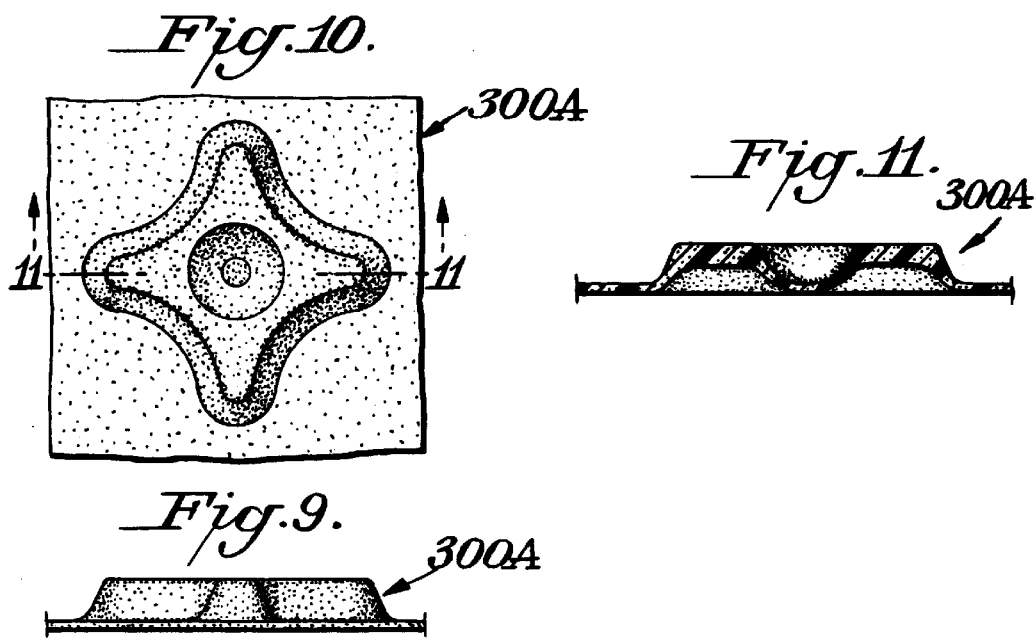

MULTIPLE CONTINUOUS PLATFORM CUTTING APPARATUS

CROSS-REFERENCE TO RELATED APPLICATIONS

This application is a continuation of U.S. patent application Ser. No. 08/899,418, filed Jul. 23, 1997, now U.S. Pat. No. 6,085,627.

Three related applications were filed concurrently with U.S. patent application Ser. No. 08/899,418. U.S. Ser. No. 08/899,460 filed Jul. 23, 1997, titled Methods for Cutting a Cellular Polymer Surface with Multiple Continuous Platforms, now U.S. Pat. No. 6,173,638; , U.S. Ser. No. 08/899,292, filed Jul. 23, 1997, titled Continuous Plaform Cutting Apparatus for Cutting a Cellular Polymer Surface; and U.S. Ser. No. 08/899,398, filed Jul. 23, 1997, titled Method of Cutting a Cellular Polymer Surface with a Continuous Platform Cutting Apparatus, now U.S. Pat. No. 6,142,053. The disclosures of these related applications are incorporated herein by reference.

Another related application is U.S. Ser. No. 08/595,573, filed Feb. 1, 1996, titled Precut Conforming Foam Underlayment for Automotive Floor Pan Carpeting, now U.S. Pat. No. 5,749,993.

BACKGROUND OF THE INVENTION

The present invention relates to apparatus for continuously shaping surfaces of one or multiple slabs of compressible or cellular polymer material, such as polyurethane foam. One or more blades cut portions of the cellular material from the slab or slabs after the slab or slabs have been compressed between compression rollers and a pair of movable patterned platforms.

Several methods and apparatus for cutting slabs of cellular polymer materials have been disclosed in the prior art. For example, U.S. Pat. No. 4,700,447 to Spann discloses convolute-cutting slabs of polyurethane foam by compressing a slab or pad of foam between a pair of rolls with opposed spaced projecting fingers arranged in a pattern and cutting the foam with a saw blade transversely just as it emerges from the rolls. The cut slab is then separated into two pads each with convolute-cut surfaces forming a series of peaks separated by valleys. The valleys on one pad are formed by slicing away foam which becomes a mating peak or projection on the other pad. Spann then shaves the peaks to form a more planar top surface. As noted in Spann, convolute cutting alone produces only rounded peaks and rounded valleys, and it is difficult, if not impossible, to produce a cut surface with peaks having substantially flat top surfaces or with recesses having substantially straight side walls. The convolute usually is intended to form the classic symmetrical and repeating "egg crate" pattern of peaks and valleys. To achieve a planar upper surface at other than the recessed portions the tops of the peaks must be cut or shaped in a second step.

Cellular polymer materials may also be cut using a hot wire cutter. A slab of such material is cut by moving the slab relative to one or more hot wires as shown, for example, in U.S. Pat. No. 4,683,791 (Demont). Only straight cuts in regular or symmetrical patterns may be formed using a hot wire cutter. See also U.S. Pat. No. 4,915,000 (MacFarlane) and U.S. Pat. No. 5,573,350 (Stegall).

Shapes may be cut into the surface of a slab of cellular polymer material using a punch cutting apparatus, such as disclosed in U.S. Pat. No. 5,299,483 (BerFong). A block of the cellular material is pressed against a template so that a portion of the material is forced through an opening in the template. The exposed material is then cut by a blade and removed, leaving a recess or cavity in the slab. This method cuts one block of material at a time, and only one surface at a time.

U.S. Pat. No. 4,351,211 (Azzolini) compresses a block of foam material against a template or die having an aperture therein using a pair of plates with concave and convex portions. The compressed foam is transversely cut along the template as it is held between the plates. More complex cut regions may be obtained than when using a template without the plates with raised and depressed portions, but only one block is cut at a time. Other template or pattern cutting methods are shown in U.S. Pat. No. 3,800,650 (Schroder) and U.S. Pat. No. 3,653,291 (Babcock).

The surface of a cellular polymer material may be shaped by molding or embossing, as opposed to cutting. U.S. Pat. No. 4,383,342 (Forster), for example, discloses injecting the foam-forming composition into a mold cavity. After sufficient curing time, the individual foamed article is removed from the mold. Other one-shot molding techniques and apparatus are known to persons of skill in the art. The molded cellular polymer product generally forms a tough skin at the surfaces that were in contact with the mold.

Continuous and semi-continuous molding processes are also known. These processes have the same drawbacks associated with one-shot molding techniques. For example, U.S. Pat. Nos. 4,128,369 and 4,290,248 (Kemerer, et al.) disclose an apparatus and method for impression molding thermoplastic products. The thermoplastic material in a liquid state is injected between compressed traveling belt molds. As the belt molds travel away from the point of introduction of the thermoplastic, they are cooled, which in turn cools the thermoplastic material, allowing it to solidify. The hardened molded thermoplastic material is removed from between the belts to form the finished product. Kemerer does not show a method for cutting or shaping a compressible and expandable cellular polymer material, such as polyurethane foam.

A method of embossing a foam surface using a patterned metallic embossing belt or band is shown in U.S. Pat. 4,740,258 (Breitscheidel). The foam is heated and then pressed against the embossing belt. The belt is removed after the foam surface cools. The embossed surface by design has a hardened skin. No method for cutting or shaping the foam is disclosed.

U.S. Pat. No. 5,534,208 (Barr) discloses a continuous rotary method for surface shaping synthetic foams in which the foam is compressed between a compression roller and a die roller having raised and recessed portions. The portions of the foam extruded into the recesses in the die roller are cut away. The compressed foam portions return to an uncompressed state after passing through the rollers. As a result, a mirror-image pattern to the pattern on the surface of the die roller is cut on the surface of the foam. The diameter of the die roller limits the length of the shaped synthetic foam article that may be formed. In addition, only one foam surface may be shaped with each pass between the die roller and the compression roller.

The prior art does not disclose an apparatus for continuously shaping a compressible or cellular polymer material of unlimited length by cutting to form recesses of various depths and various symmetrical and nonsymmetrical shapes. Nor does the prior art disclose a profile cut product without the hardened skin or hard spots associated with molded or embossed products. Nor does the prior art disclose cutting cellular polymer materials with an apparatus that includes a movable patterned platform, such as an endless belt or a series of connected panels defining at least one recess or void into which the cellular material may be compressed before cutting the material transversely with a knife blade.

SUMMARY OF THE INVENTION

An apparatus for continuously shaping a compressible or cellular polymer material, such as polyurethane foam, by cutting and removing portions of the material is disclosed. A pair of compression rollers which have interposed between them a pair of moving patterned platforms compress together the moving patterned platforms with one or more slabs of cellular polymer material held there-between. If one slab is used, portions of cellular polymer material from one face of the slab fill recesses or voids formed in the first moving patterned platform. Portions of cellular polymer material from the other face of the slab fill recesses or voids formed in the second moving patterned platform.

The apparatus may use a single knife blade and form two cut products from the single slab of cellular polymer material. The blade, positioned between the compression rollers and between the moving patterned platforms and closely adjacent the region in which the slab is compressed by the rollers, cuts the slab transversely just as it emerges from between the compression rollers. After leaving the apparatus, the cut slab is separated into two cut products that have on their cut surfaces pattern cut regions. The cut regions on the first product correspond in mating relation to the raised regions (projections) on the second cut product. Conversely, the cut regions on the second product correspond in mating relation to the raised regions on the second cut product.

The moving patterned platforms may be belts or panels or a series of panels that may be formed into a continuous path. Each of the moving patterned platforms may define several recesses that are separated or interconnected, symmetrical or nonsymmetrical, repeating or nonrepeating. The position of the recesses on one patterned platform need not correspond to the position of the recesses on the second patterned platform. Where the cellular polymer material is compressed so that it fills a recess in one moving patterned platform and there is no corresponding recess in the other moving platform, the knife blade will cut deeper into the slab creating a void in the part of the slab that is farther away from the recess and closest to the patterned platform without the recess. In other words, a greater amount of cellular material is forced to one side of the blade when it fills a recess in the patterned platform. Where the recesses in the patterned platform are complementary to one another, however, such that an equal amount of cellular polymer material is compressed within the recesses of identical depth in both platforms, in this region the slab will be split or cut transversely substantially nearly in the center of its thickness because a nearly equal amount of material is found on either side of the blade.

The apparatus using a single blade may also form two cut products from two slabs of cellular polymer material. In this embodiment of the invention, the two slabs in stacked relation are fed between the compression rollers and the movable patterned platforms. The blade is positioned as close as possible to the vertical midpoint between the outer patterned surfaces of the patterned platforms. Where the slabs are compressed between the platforms in regions where neither platform contains a recess, if the blade is centered between the platforms, no portion or no substantial portion of the surfaces of the slabs will be cut by the blade. Similarly, if both of the patterned platforms have recesses of equal depth, no portion or no substantial portion of either slab surface will be forced beyond the cutting edge of the blade.

If, however, a recess is formed in the region compressed between the compression rollers of one platform and there is no corresponding recess formed in the corresponding region of the other platform, then a portion of the cellular material from one of the slabs will be forced beyond the blade edge and the cellular material will be cut such that a recess will be formed in the surface of the slab. The slab adjacent to the platform without the recess will be forced beyond the blade edge and cut by the blade. Alternatively, if a recess of one depth is formed in the region compressed between the compression rollers of one platform and a corresponding recess of a different depth is formed in the corresponding region of the other platform, cellular polymer material will be cut from the portion of the slab that is forced beyond the blade. The slab adjacent to the recess of greater depth likely will be compressed away from the blade so that the slab adjacent to the recess of lesser depth will be compressed with a portion forced beyond the blade for cutting. The depth of any recesses formed in the surfaces of the slabs will depend upon the compression factor of the cellular material and on the depth and placement of the recesses in the patterned platforms.

Where two slabs in stacked relation are fed through the compression rollers and between the patterned platforms, each slab is cut to form profile cut surfaces with recesses. Waste material cut from the slabs is removed. Unlike the result when only one slab of foam is cut by the apparatus, the surfaces of the two cut slabs do not nest together.

If it is desired to obtain two cut products with mirror image cut patterns on their surfaces simultaneously, the apparatus may be used with two blades. With this embodiment of the invention, two slabs in stacked relation are fed between the compression rollers and the patterned platforms. The two blades are positioned nearly adjacent to the vertical midpoint between the surfaces of the patterned platforms and near the point at which the slabs emerge from between the rollers. The slab surfaces in contact with each other when the stack is fed between the rollers are the surfaces subject to being cut by the blades. Each blade cuts a portion of the slab surface where the slab material is forced beyond the blade, forming cut portions that correspond in pattern and shape to the pattern and shape of recesses formed in the opposite patterned platform. The depth of cut will vary by the compression factor of the cellular polymer material.

Alternatively, the upper and lower surfaces of a single cellular polymer material slab fed between the compression rollers may be profile cut simultaneously using the apparatus of yet another embodiment of the invention. First and second blades are provided just at the point the compressed cellular material emerges from the compression rollers. The second blade is spaced apart from the first blade, such that the first blade cuts portions of the upper surface of the slab and the second blade cuts portions of the lower surface of the slab. The cut portions are removed, leaving the finished profile cut product that emerges from between the two blades. With this embodiment of the invention, complex cut profiles may be formed in the upper and lower surface of the slab. The cut portions may be interconnecting or complementary to one another. Portions of the slab in one surface region may be cut simultaneously as portions of the slab in the opposite surface region are cut. Fine patterned shapes not heretofore achieved by continuous cutting methods for cellular materials may be formed using this apparatus.

DESCRIPTION OF THE FIGURES

Numerous other objects, features and advantages of the invention shall become apparent upon reading the following detailed description taken in conjunction with the accompanying drawings, in which:

FIG. 7 is a side elevational view of a cellular polymer underlayment mat defining patterned recesses that have been cut into the mat using the continuous platform cutting apparatus of the invention;

FIG. 8 is a top plan view of the mat of FIG. 7;

FIG. 9 is a fragmental side elevational view of an ornamental star profile cut into a cellular polymer material using the continuous platform cutting apparatus of the invention;

FIG. 10 is a top plan view of the cut material of FIG. 9; and

FIG. 11 is a cross-sectional view in side elevation taken along line 11—11 of FIG. 10.

DESCRIPTION OF THE PREFERRED EMBODIMENTS

Figure 1:
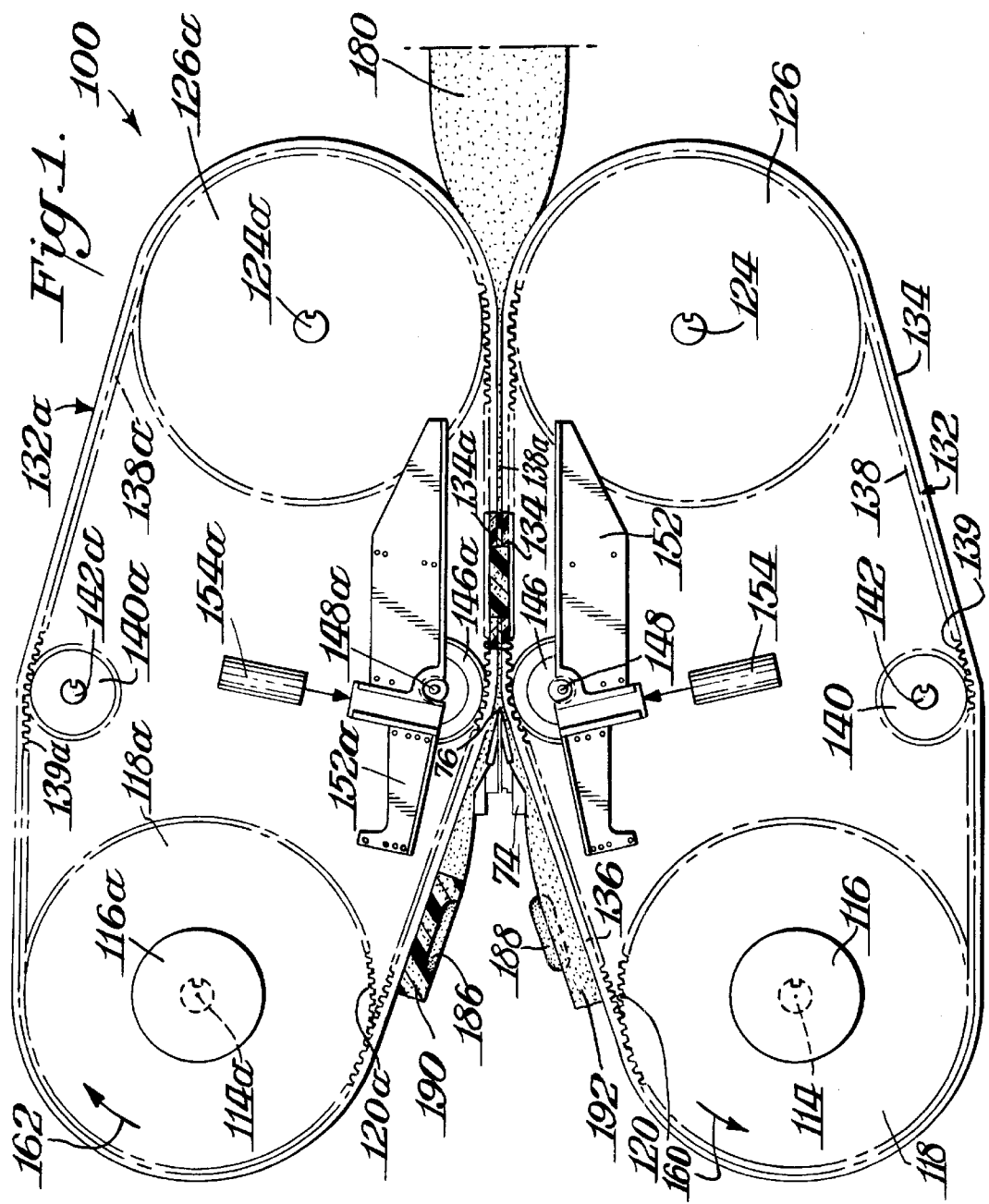
FIG. 1 is a schematic side elevational view of the continuous platform cutting apparatus of the invention having two platforms traveling between two compression rollers and having a single knife blade.

Referring first to the embodiment 100 of the invention as shown in FIG. 1, a first drive roller 118 is mounted for rotation on shaft 114. Shaft 114 is held for free rotation by a support frame (not shown). The peripheral edges of the first drive roller 118 are provided with gear teeth or ribs 120. Alternatively, separate attached gears may be provided at each end of the drive roller. Shaft 114 is driven by a motor 116.

First follower roller 126 is mounted for rotation on shaft 124. Shaft 124 is held by a supporting frame (not shown). Shaft 124 is free to rotate within a bearing recess (not shown).

First endless belt 132 has a patterned facing surface 134 and an opposite surface 138. The belt 132 is mounted around first drive roller 118 and first follower roller 126. Ribs or teeth 139 on the opposite belt surface 138 mate with the ribs or teeth 120 provided on the first drive roller 118. When the first drive roller 118 rotates on its shaft 114, it causes belt 132 to travel along a path around the rollers in the direction indicated by arrow 160 in FIG. 1.

First idler roller 140 is mounted for rotation on shaft 142. Shaft 142 is supported by a frame (not shown).

First compression roller 146 is mounted for rotation on shaft 148. The shaft 148 is driven by a motor (not shown). The shaft 148 is held within a bearing recess within a supporting frame 152. Tensioning means 154, such as springs or air cylinders, urge the shaft 148 and the roller 146 toward a complementary compression surface.

A second drive roller 118a is mounted for rotation on shaft 114a. Shaft 114a is held for free rotation by a supporting frame (not shown). The peripheral edges of the second drive roller 118a are provided with gear teeth or ribs 120a. Alternatively, separate attached gears may be provided at each end of the drive roller. Shaft 114a is driven by a motor 116a.

Second follower roller 126a is mounted for rotation on shaft 124a. Shaft 124a is held by a supporting frame (not shown). Shaft 124a is free to rotate within a bearing recess (not shown).

Second endless belt 132a has a patterned facing surface 134a and an opposite surface 138a. The belt 132a is mounted around second drive roller 118a and second follower roller 126a. Ribs or teeth 139a on the opposite belt surface 138a mate with the ribs or teeth 120a provided on the second drive roller 118a and the ribs or teeth 130a on the second follower roller 126a. When the second drive roller 118a rotates on its shaft 114a, it causes belt 132a to travel along a path around the rollers in the direction indicated by arrow 162 in FIG. 1.

Second idler roller 140a is mounted for rotation on shaft 142a. The shaft 142a is supported by a frame (not shown).

Second compression roller 146a is mounted for rotation on shaft 148a. The shaft 148a is driven by a motor (not shown). The shaft 148a is held within a bearing recess within a supporting frame 152a. Tensioning means 154a, such as springs or air cylinders, urge the shaft 148a and the roller 146a toward the complementary compression surface of the first compression roller 146.

The space or gap between the compression surfaces of the first compression roller 146 and second compression roller 146a is wide enough to allow first and second endless belts 132, 132a to travel between the rollers.

Figure 4A:
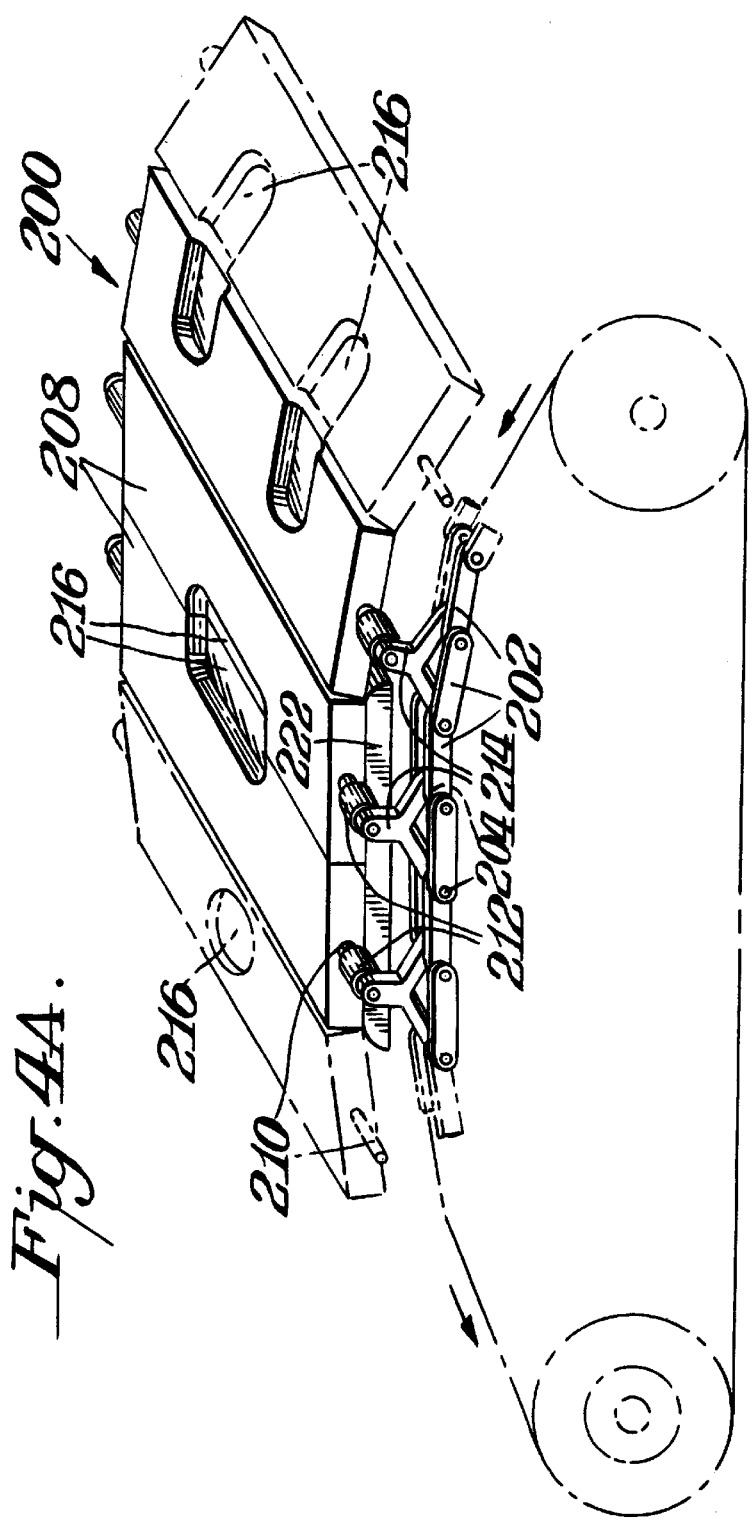
FIG. 4A is a schematic perspective view of an alternate moving platform for the continuous platform cutting apparatus of the invention.
Figure 4:
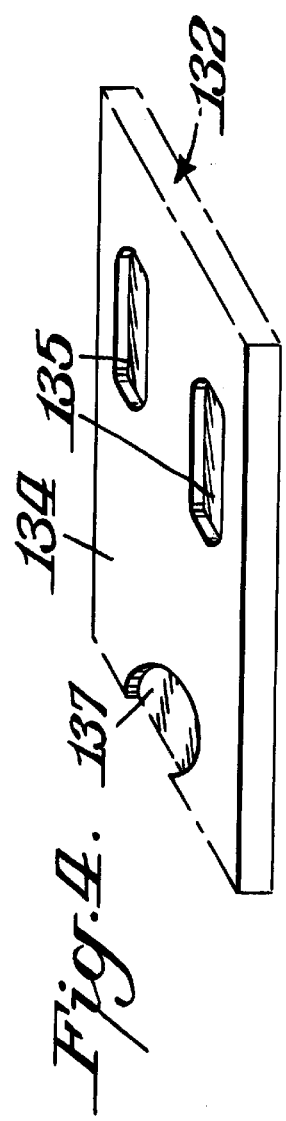
FIG. 4 is a schematic perspective view of a patterned surface of a moving platform for the continuous platform cutting apparatus of the invention.

A portion of a representative patterned facing surface 134 in a belt 132 is shown in perspective view in FIG. 4. The surface includes various shaped recesses 135 and 137, which may be identical or different shapes with equal or different depths within the surface 134 of the belt 132. The recesses may be interconnected or separate and may form a repeating or non-repeating pattern. The recesses in patterned facing surface 134a may be similar to those formed in the patterned facing surface 134.

A knife blade 76 is held within casing 74. The blade 76 must have a sharp tip that is sufficiently sharp to cut cellular polymer materials, such as polyurethane foams. Blade orientation within the casing may be adjusted. Because the blade 76 construction is known and understood by persons of skill in the art of cutting cellular polymer materials, such as polyurethane foams, it will not be described in detail.

The blade 76 is positioned adjacent to the compression rollers 146, 146a so that the sharp tip of the blade is adjacent to or just beyond the point at which the outer surfaces of the compression rollers 146, 146a act to their greatest extent to compress material that is placed between the rollers. The blade 76 is also positioned between the patterned facing surfaces 134, 134a of the endless belts 132, 132a. The blade 76 should be positioned so that it will not cut the patterned facing surfaces 134, 134a of the belts 132, 132a. The blade 76 should not interfere with the rotation of the rollers 146, 146a or the movement of the belts 132, 132a.

In the embodiment shown in FIG. 1, as a single slab 180 of cellular material, such as polyurethane foam, is fed between the patterned facing surfaces 134, 134a of the endless patterned belts 132, 132a, the slab 180 is compressed by the rollers 146, 146a. When the slab 180 travels into the space between the rollers 146, 146a, portions of the compressed slab material are held within the recess 136 defined within the facing surfaces 134, 134a of the belts 132, 132a between rollers 146, 146a.

Knife blade 76 transversely cuts the slab 180 just as the slab 180 emerges from between the compression rollers 146, 146a. If the knife blade 76 is positioned at the midpoint between the belts 132, 132a, and if no recesses are present in either patterned belt 134, 134a surface, the cuts into the slab 180 are made in the very center of the slab thickness, splitting the slab into two parts. When one patterned belt 132 defines a recess 136, the cellular material of the slab 180 is compressed into that recess, forcing a greater amount of cellular material to one side of the blade 76. Thus, in the region of the slab in which material has been forced into the recess, the transverse cut into the slab material forms a trough or recess 186 in one cut part surface and a mating projection 188 in the other cut part surface. The depth of the recess 186 formed in the cut part depends upon the depth of the recess 136 formed in the patterned belt 132. If recesses are formed in both patterned belts 132, 132a and these recesses are presented simultaneously in the compression region between the compression rollers, the depth of cut in one part and the height of projection in the other part will vary depending upon how much cellular material is compressed to one side or the other side of the blade.

After the slab 180 is cut as it emerges from between the rollers 146, 146a, the cut slab is separated into two profiled products 190, 192. The resulting products 190, 192 each have regions with greater and lesser cut portions forming cut profiles in mating relation to each other. The cut profiles will nest together and there is no waste. Slabs of cellular polymer material may thus be provided with profiled surfaces with an endless array of patterns, whether symmetrical or nonsymmetrical, simple or complex, or repeating or nonrepeating.

The blade 76 may be positioned at the midpoint between the patterned facing surfaces 134, 134a of the endless belts 132, 132a. Alternatively, it may be positioned closer to one belt than the other. The position and orientation of the blade 76 determines the position of the nominal transverse cut that is made in the slab to divide the slab into two portions. If the blade 76 is held closer to the midpoint, as shown in FIG. 1, the nominal thickness of the two cut portions is nearly equal. A combination of a nominally thicker and nominally thinner cut portion may be formed by moving the blade closer to one of the belts.

Figure 2:
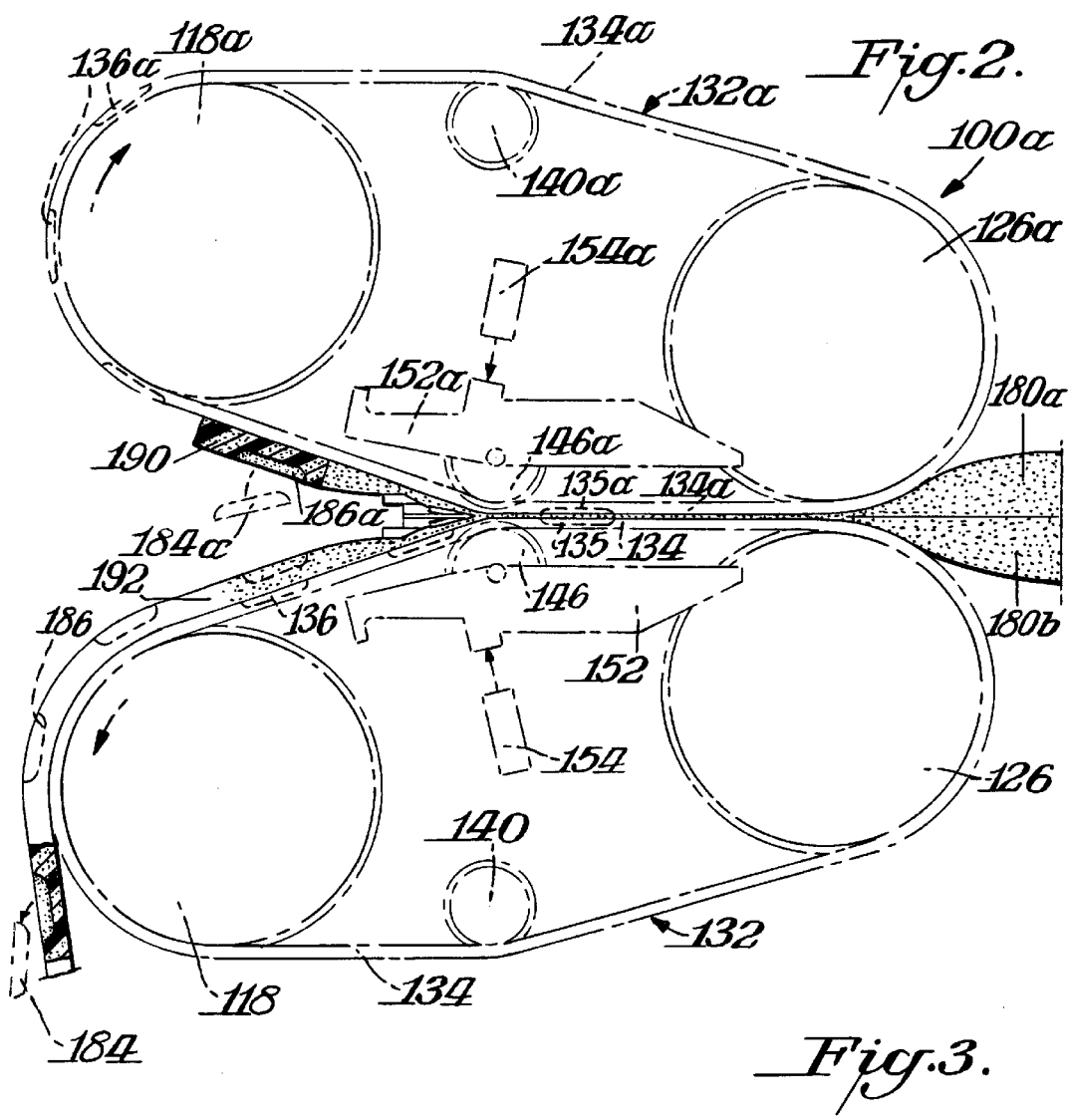
FIG. 2 is a schematic side elevational view of the continuous platform cutting apparatus of FIG. 1, showing how two slabs in stacked relation may be fed between the platforms and cut by the single knife blade.

Referring next to FIG. 2, in which like reference numerals refer to like parts, an alternate embodiment 100a of the invention has patterned belts 132, 132a mounted around follower rollers 126, 126a, and driven by drive rollers 118, 118a, respectively. In this embodiment, two slabs of cellular polymer material 180a, 180b are placed in stacked relation, one atop the other, and fed between the patterned facing surfaces 134, 134a of the belts 132, 132a.

In FIG. 2, the knife blade 76 is positioned at the nominal midpoint between the patterned belts 132, 132a and the compression rollers, 146, 146a. Where the cellular material from the slabs 180a, 180b is compressed evenly in the region between the compression rollers, no material or only a substantially minor portion of material is cut from either slab. Where a recess or void in one of the patterned belts 132 is in the compression region, a portion of the cellular material from the slab 180b is compressed into the recess, causing a portion of the cellular material from slab 180a to the opposite side of blade 76 to be cut by the blade. As the cut slabs emerge from the compression region, the cut portion 184a may be removed from the slab 180a, leaving the resulting recess 186a in the cut product 190. The cut recess 186a corresponds in shape to the recess 136 formed in the patterned belt 132.

Similarly, where a recess or void 136a formed in the other patterned belt 132a is in the compression region, a portion of the cellular material from the slab 180a is compressed into the recess, causing a portion of the cellular material from slab 180b to the opposite side of blade 76 to be cut by the blade. As the slabs emerge from the compression region, the cut portion 184 may be removed from the cut product 192, leaving the resulting recess 186. The cut recess 186 corresponds in shape to the recess formed in the patterned belt 132a.

If complimentary recesses 135, 135a are presented to the compression region between the compression rollers simultaneously, the depths of the recesses will determine whether and what amount of the slabs 180a, 180b will be cut by the blade 76. If the recesses 135, 135a are of equal depth and the blade 76 has been positioned at the midpoint between the compression rollers 146, 146a, then none or only a very minor portion of the cellular material from the slabs 180a, 180b will be cut. Otherwise, the region with the recess of greatest depth will receive a greater amount of cellular material, causing some material from the more distant slab to pass the knife blade edge and be cut.

The depth of the recesses 136, and 136a of the patterned platforms are typically a small fraction of the depth of the corresponding cuts to be made in the surface of the cellular polymer material 180, 180a, 180b. Because of the compression factor of the foam against the patterned platforms such as belts 132, 132a, a shallow depression in the patterned platforms 132, 132a yields a much deeper depression in the foam. For example, a ⅝ inch thick sheet of foam material compressed against a recess 136 of 20 thousands of an inch in the patterned platform 132, where there is no corresponding recess 136a in the other patterned platform 132a, yielded approximately a ½ inch deep depression in the foam slab 180a. The spacing between the patterned platform surface 134 and the other platform surface 134a, if all other factors are equal, determines the compression factor of the cellular polymer and consequently the ratio of patterned platform pattern depth to foam cut depth. The depth of cut in the cellular polymer can be reduced for a given patterned platform recess depth by increasing the spacing between the compression rollers and in turn the patterned platforms, thus reducing the compression factor.

Figure 3:
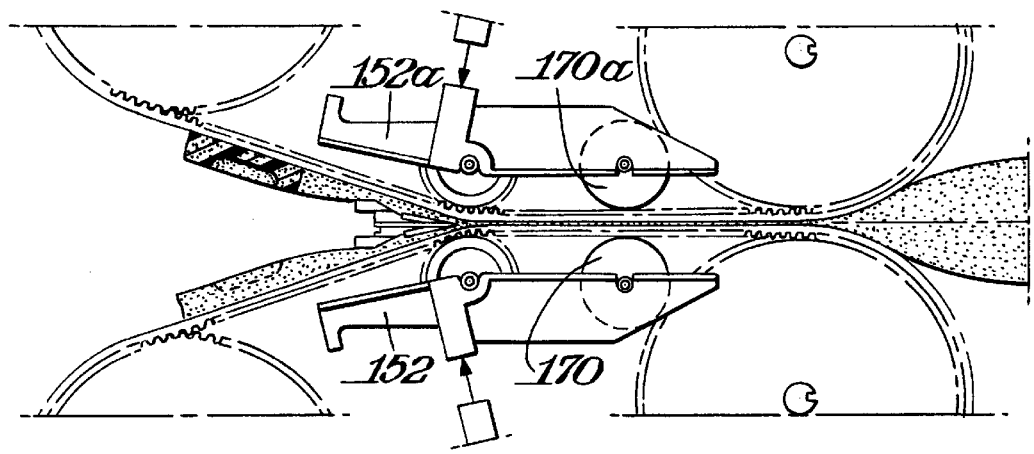
FIG. 3 is a fragmental side elevational view of an alternate continuous platform cutting apparatus according to the invention having a plurality of compression rollers.

Referring now to FIG. 3, wherein like reference numerals refer to like parts, the alternate embodiment of the invention includes additional compression rollers 170, 170a mounted for rotation in supporting frames 152, 152a. The additional compression rollers allow the slab or slabs of cellular material to be fed to the compression region more smoothly. The extra rollers reduce slipping between the patterned belts and the cellular material. For purposes of the invention, the "compression region" is the region in which the cellular material is compressed just before it emerges for cutting by the knife blade.

Where the patterned platforms 132, 132a comprise endless belts as shown in FIGS. 1, 2, 3 and 4, such belts preferably are formed from a flexible material such as rubber or silicone rubber or urethane. Each belt is thick enough to withstand the compressive forces, preferably about 0.375 inches or more, and has a durometer of about 35 or higher. Alternatively, the belt may be formed of fiberglass reinforced polyurethane or other composite materials suitable for endless belts that meet the required thickness and durometer.

As shown in FIG. 4A, in an alternate embodiment 200 rather than using an endless belt, the patterned platform may be constructed as a continuous or endless series of interlinked plates or panels 208 driven by chain and sprocket. The series of plates 208, preferably formed from metal or other sturdy substrate, are mounted on shafts 210. The shafts 210 are held for rotation within bearing sleeves 212. Y-shaped follower bars 214 are connected at one end to the shafts 210 and at the other two ends to pin members 204 holding together the links 202 of a chain. The chain links 202 are driven by sprockets (not shown), which in turn are driven by motors (not shown).

The plates 208 may define one or more recesses 216, or portions of recesses 216. The recesses may be cut through a portion or through the entire thickness of a plate. The recesses may be formed in rectangular, circular or other geometric shape. The recesses may be cut in non-uniform, non-symmetrical and not repeating shapes. The recesses need not be contained wholly within a single plate. Rather, a recess defined by one plate may complement the recess defined by an adjacent plate to form larger or more complex recess shapes.

When a series of plates are used as the patterned platform, the slab of cellular polymer material will be pressed against the plates by a compression roller (not shown in FIG. 4A) so that a portion of the material is compressed into the recesses in the plates and is cut away from the slab by a knife blade just as the cellular material emerges from the compression roller. A support platform 222 is provided below the plates 208 to support the plates when compression forces are exerted on them by the compression roller.

Figure 5:
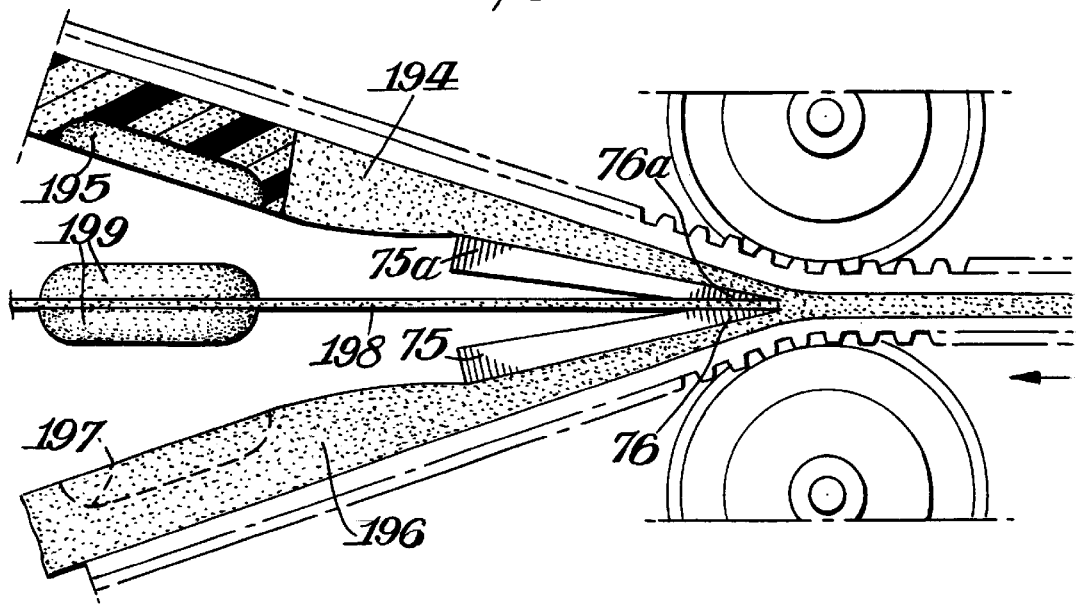
FIG. 5 is a fragmental side elevational view of an alternate embodiment of the continuous platform cutting apparatus that illustrates profile cutting of a single slab of cellular polymer material with two knife blades.
Figure 6:
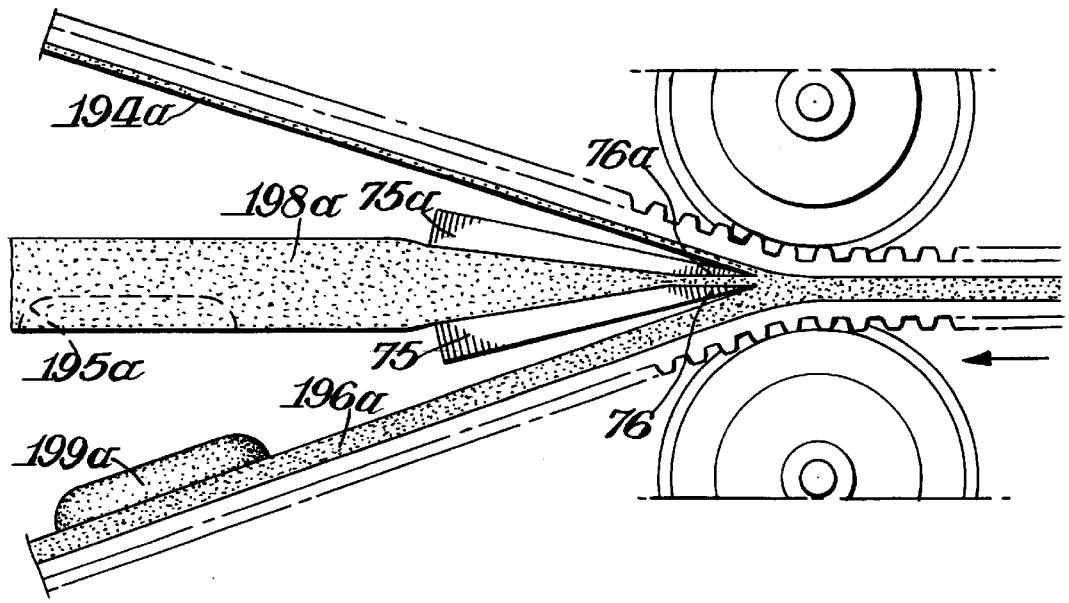
FIG. 6 is a fragmental side elevational view of the embodiment of the invention shown in FIG. 5 in which the knife blades are positioned in a different orientation.

Further alternate embodiments of the invention are shown in FIGS. 5 and 6. In these embodiments, second knife 75a with blade 76a is held in spaced apart relation adjacent to first knife 75 with blade 76. The blades 76, 76a are positioned between the compression rollers 146, 146a and the patterned surfaces 134, 134a of the platforms 132, 132a.

Referring first to FIG. 5, the blades 76, 76a are positioned substantially at the vertical midpoint between the compression rollers. A single slab 180 of cellular polymer material fed between the compression rollers 146, 146a is cut both by blade 76 and blade 76a just as it emerges from the rollers. If the region of the patterned platforms between the compression rollers when the slab is compressed has no recesses formed in either platform, the slab will be cut transversely at two places, forming three cut portions 194, 196, 198 without any recesses or projections formed in the cut portions. However, if the region of at least one of the patterned platforms between the compression rollers when the slab is compressed defines a recess, a portion of the slab material is compressed into that recess causing a greater portion of the slab material to be forced to one side of the blades, and cut by the blades. Thus, recesses 195, 197 substantially conforming in shape to the shape of the recesses in the patterned platform are cut into the cut surfaces of the cut products 194, 196, and projections 199 are formed in the third cut product 198 that emerges from between the blades 76, 76a. Depending upon the desired end products, and the thickness of the slab of foam 180 and the space provided between the blades 76, 76a, the cut product 198 also may be discarded as waste.

Referring next to FIG. 6, the blades 76, 76a are spaced apart to a greater extent and positioned closer to the upper patterned platform 132a. By adjusting the orientation of the blades, different cut products may be produced from a slab 180. In FIG. 6, a thin layer 194a is shaved from the top surface of the slab 180, a recess 195a is cut into the cut product 198a, and a projection 199a is formed on the other cut product 196a. Center cut product 198a is the usable end product, with cut products 194a and 196a discarded as waste. However, one, two or all three cut products may form usable products, depending again upon the thickness of the slab of foam 180, the blade position and spacing, and the desired cut end products to be obtained.

An example of a profile-cut product 300 made according to the invention is shown in FIGS. 7 and 8. The profile cut product 300 represents a cellular polymer insulating barrier or underlayment that will be installed in the interior of a motor vehicle between the floor surface and the carpeting. The upper surface 310 of the underlayment has been cut to provide complex patterns of recesses or voids. As shown in FIG. 8, generally rectangular shaped recesses 312 have been cut into the surface of the product 300. In addition, more complex shaped recesses, such as interconnecting generally oval shaped recesses 314 and interconnecting straight-edged and curved-edged recesses 316, may be cut into the cellular material. For the underlayment for a motor vehicle, preferably one surface, here what has been referred to has the upper surface 310, is cut and the opposite surface remains uncut. The cut surface of the underlayment is placed adjacent to the motor vehicle surface so that the voids and recesses in the underlayment mate with shaped portions projecting from the vehicle surface. In this manner, the underlayment may be provided so as to match the contour of the vehicle interior surface. Once the underlayment is installed in the vehicle, carpet or other covering may be installed adjacent to the uncut and generally smooth surface of the underlayment.

As shown in FIGS. 9–11, a pattern-profiled cut product of cellular material, such as polyurethane foam, may be obtained using the embodiments of the invention as shown in FIGS. 5 and 6. Thus, portions of material are simultaneously cut away from the top surface and the bottom surface of the slab to result in a complex, three-dimensionally shaped profile cut product. As seen from the top (FIG. 10), the four-pointed star shaped product 300A has four pointed tip projecting regions and a circular-shaped central divot. As seen in cross section (FIG. 11), material has been cut away from the underside of the pointed tip regions, but these tip regions still have a thickness greater than the thickness of the bordering regions.

The apparatus according to this invention might be used to make profile cut products for a variety of end uses. In addition to motor vehicle carpet systems, profile cut products might be made for other vehicle interior applications, such as headliners, side panels and dash panels. Profile cut products might also be used for mattresses, mattress pads, pillows, furniture cushions, filters, sports equipment, footwear components and packaging. The above list is intended to be representative and not exhaustive as to all the possible applications for the invention.

While preferred embodiments of the invention have been described and illustrated here, various changes, substitutions and modifications to the described embodiments will become apparent to those of ordinary skill in the art without thereby departing from the scope and spirit of the invention.

I claim:

1. An apparatus for shaping a slab of cellular polymer material by cutting portions of the material, comprising:

a pair of compression rollers, each roller rotatable on its own axis and having an outer surface, wherein the outer surface of the first roller is spaced apart from the outer surface of the second roller to define a gap therebetween so that the rollers exert a compressive force against the slab of cellular polymer material as said slab is passed through said gap between the compression rollers;

a patterned first platform with a facing surface and an inner surface interposed between the compression rollers with its inner surface adjacent to the outer surface of the first roller and movable with relation thereto, said patterned first platform defining on its facing surface at least one recess to receive a portion of the cellular polymer material when a first region of the slab is compressed between the compression rollers;

a patterned second platform with a facing surface and an inner surface interposed between the compression rollers with its inner surface adjacent to the outer surface of the second roller and movable with relation thereto, said patterned second platform defining on its facing surface at least one recess to receive a portion of the cellular polymer material when a second region of the slab is compressed between the compression rollers; and a blade for cutting the slab of cellular polymer material into mating first and second profiled sections when the slab emerges from between the compression rollers, said blade positioned between the facing surfaces of the first and second platforms so that the first profiled section is formed with a projection in a region corresponding to the first region of the slab wherein the first portion of the cellular polymer material is held within the recess of the patterned first platform when the first region of the slab is passed through, said gap and compressed between the compression rollers, and the second profiled section is formed with a recess in a region corresponding to the first region of the slab wherein the first portion of the cellular polymer material is held within the recess of the patterned first platform when the slab is passed through said gap and compressed between the rollers.

2. The apparatus of claim 1, wherein the first profiled section is formed with a recess in a region corresponding to the second region of the slab wherein the second portion of the cellular polymer material is held within the recess of the second patterned platform when the slab is compressed between the compression rollers, and the second profiled section is formed with a projection in the region corresponding to the second region of the slab wherein the second portion of the cellular polymer material is held within the recess of the second patterned platform when the slab is compressed between the rollers.

3. The apparatus of claim 2, wherein the patterned first platform is an endless flexible belt.

4. The apparatus of claim 3, wherein the endless flexible belt forming the first platform has a durometer of at least 35.

5. The apparatus of claim 2, wherein the patterned second platform is an endless flexible belt.

6. The apparatus of claim 5, wherein the facing surface of the belt defines a plurality of recesses.

7. The apparatus of claim 6, wherein the plurality of recesses defines a non-symmetrical, non-repetitive pattern.

8. The apparatus of claim 5, wherein the endless flexible belt forming the second platform has a durometer of at least 35.

9. An apparatus for simultaneously shaping a pair of slabs of cellular polymer material by cutting portions of the material from surface of the slabs, comprising:

a pair of compression rollers, each roller rotatable on its own axis and having an outer surface, wherein the outer surface of the first roller is spaced apart from the outer surface of the second roller to define a gap therebetween so that the rollers exert a compressive force against the slabs of cellular polymer material as said slabs are passed through the gap between the compression rollers;

a patterned first platform with a facing surface and an inner surface interposed between the compression rollers with its inner surface adjacent to the outer surface of the first roller and movable with relation thereto, said patterned first platform defining on its facing surface at least one recess to receive a portion of the cellular polymer material of the first slab when a first region of the slabs is passed through said gap and compressed between the compression rollers;

a patterned second platform with a facing surface and an inner surface interposed between the compression rollers with its inner surface adjacent to the outer surface of the second roller and movable with relation thereto, wherein the patterned second platform has formed in its facing surface at least one recess to receive a portion of the cellular polymer material of the second slab when the first region of the slabs is compressed between the compression rollers, and wherein a midpoint is defined between the facing surface of the first platform and the facing surface of the second platform; and a blade for cutting the slabs of cellular polymer material into complementary first and second profiled products when the slabs emerge from between the compression rollers, said blade positioned between the facing surfaces of the first and second platforms so that the first profiled product is formed by cutting a recess in the surface of the second slab at a region corresponding to the compressed slab region wherein the portion of the first slab is held within the recess of the patterned first platform when the slabs are compressed between the compression rollers.

10. The apparatus of claim 9, wherein the blade is positioned near the midpoint of the space between the facing surfaces of the platforms.

11. The apparatus of claim 9, wherein the slabs have substantially equal thicknesses in an uncompressed state.

12. The apparatus of claim 9, wherein the patterned first platform is an endless flexible belt.

13. The apparatus of claim 12, wherein the facing surface of the belt defines a plurality of recesses.

14. The apparatus of claim 13, wherein the facing surface of the belt defines a plurality of recesses in a non-symmetrical, non-repetitive pattern.

15. The apparatus of claim 12, wherein the endless flexible belt forming the first platform has a durometer of at least 35.

16. The apparatus of claim 9, wherein the second platform is an endless flexible belt.

17. The apparatus of claim 16, wherein the endless flexible belt forming the second platform has a durometer of at least 35.

* * * * *